US011526192B2

(12) United States Patent

Nakase et al.

(10) Patent No.: US 11,526,192 B2

(45) Date of Patent: Dec. 13, 2022

(54) MULTI-DIRECTIONAL INPUT DEVICE AND GAME MACHINE

(71) Applicant: Shenzhen Zesum Technology Co., Ltd., Shenzhen (CN)

(72) Inventors: Yusho Nakase, Shenzhen (CN); Shiying Yang, Shenzhen (CN); Chaoxian Chen, Shenzhen (CN)

(73) Assignee: Shenzhen Zesum Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/232,602

(22) Filed: Apr. 16, 2021

(65) Prior Publication Data

US 2022/0155810 A1 May 19, 2022

(30) Foreign Application Priority Data

Nov. 19, 2020 (CN) ......................... 202011305798.2

(51) Int. Cl.

*G06F 3/033* (2013.01)
*G05G 9/047* (2006.01)

(52) U.S. Cl.

CPC ... *G05G 9/047* (2013.01); *G05G 2009/04718* (2013.01); *G05G 2009/04777* (2013.01)

(58) Field of Classification Search

CPC ......... G05G 9/047; G05G 2009/04718; G05G 2009/04777

USPC ............... 345/156, 161, 169; 200/61.39, 600

See application file for complete search history.

(56) References Cited

U.S. PATENT DOCUMENTS 5,619,021 A * 4/1997 Yamamoto ......... G05G 9/04796 200/6 A
6,001,014 A * 12/1999 Ogata ..................... A63F 13/02 463/37
6,064,369 A * 5/2000 Okabe ...................... G05G 5/06 345/161

(Continued)

FOREIGN PATENT DOCUMENTS

CN 201323154 Y 10/2009
JP H1153995 A 2/1999

(Continued)

OTHER PUBLICATIONS

First Office Action issued in counterpart Japanese Patent Application No. 2020-197772, dated Nov. 24, 2021.

(Continued)

*Primary Examiner* — Thuy N Pardo

(74) *Attorney, Agent, or Firm* — Westbridge IP LLC

(57) ABSTRACT

Disclosed are a multi-directional input device and a game machine. The multi-directional input device includes a first rocker arm and a second rocker arm, the first rocker arm and the second rocker arm are distributed in up-down direction, each of the first rocker arm and the second rocker arm includes a C-shaped part, a rotating shaft part is provided on opposite ends of the C-shaped part, the rotating shaft part is fixed by the cover, and a rotating axis is defined at both ends of the rotating shaft part; the first rocker arm and the second rocker arm rotate relative to the cover through their respective rotating shaft part; the operating part is penetrated through the C-shaped part, and the C-shaped part defines an elongated hole guiding the operating part to pivot.

8 Claims, 6 Drawing Sheets

(56) References Cited

U.S. PATENT DOCUMENTS

| | | | | |
|---|---|---|---|---|
| 6,177,640 | B1 * | 1/2001 | Okabe | G05G 9/047 200/6 A |
| 6,300,940 | B1 * | 10/2001 | Ebina | G06F 3/03548 345/161 |
| 6,504,115 | B2 * | 1/2003 | Nakai | H03K 17/975 200/600 |
| 2002/0056621 | A1 * | 5/2002 | Nakai | G05G 9/047 200/61.39 |
| 2012/0260760 | A1 * | 10/2012 | Terao | G05G 9/047 74/471 XY |
| 2012/0260763 | A1 * | 10/2012 | Terao | G05G 1/08 74/507 |
| 2012/0315985 | A1 * | 12/2012 | Granger | G07F 17/3216 463/31 |
| 2015/0031460 | A1 * | 1/2015 | Riedel-Kruse | A63F 13/24 463/42 |
| 2018/0140949 | A1 * | 5/2018 | Youn | A63B 24/0087 |
| 2018/0333155 | A1 * | 11/2018 | Hall | A61B 17/072 |
| 2019/0021693 | A1 * | 1/2019 | Bharat | A61B 8/0841 |
| 2019/0358532 | A1 * | 11/2019 | Takei | G06F 3/016 |
| 2020/0405434 | A1 * | 12/2020 | Schuh | A61B 34/30 |
| 2021/0052338 | A1 * | 2/2021 | Hill | A61B 34/71 |

FOREIGN PATENT DOCUMENTS

| | | | |
|---|---|---|---|
| JP | H11195354 | A | 7/1999 |
| JP | 2003223276 | A | 8/2003 |
| JP | 2018532234 | A | 11/2018 |
| JP | 2021106097 | A | 7/2021 |
| TW | 201608590 | A | 3/2016 |
| TW | M561319 | U | 6/2018 |

OTHER PUBLICATIONS

First Office Action issued in counterpart Taiwanese Patent Application No. 109141800, dated Oct. 7, 2021.

* cited by examiner

MULTI-DIRECTIONAL INPUT DEVICE AND GAME MACHINE

CROSS REFERENCE TO RELATED APPLICATIONS

The present disclosure claims the priority of Chinese Patent Application No. 202011305798.2, filed on Nov. 19, 2020 and entitled "MULTI-DIRECTIONAL INPUT DEVICE AND GAME MACHINE", which is hereby incorporated by reference in its entirety.

TECHNICAL FIELD

The present disclosure relates to the technical field of input devices, in particular to a multi-directional input device and a game machine using the same.

BACKGROUND

A multi-directional input device generally includes a housing, an operator rotatably arranged in the housing, two rocker arms that rotate with pivoting of the operator, and a detection device that detects rotating amount of the rocker arms and outputs a corresponding signal according to the rotating amount of the rocker arms. However, in the related art, one of the two rocker arms of the multi-directional input device is usually driven by a rotating part of the operator, and the other one of which is usually driven by an operating part of the operator. That is, the two rocker arms are driven by two different parts of the operator. As a result, the two rocker arms are prone to generate different resistances to the operator, resulting in a difference in hand feeling when the multi-directional input device drives the two rocker arms through the operator.

SUMMARY

The main purpose of the present disclosure is to provide a multi-directional input device, which aims to drive a first rocker arm and a second rocker arm of the multi-directional input device by a same part of an operator, so that the possibility that the first rocker arm and the second rocker arm generate different resistances to the operator is reduced, thereby ensuring the consistency of the hand feeling of the multi-directional input device during use.

In order to achieve the above purpose, the multi-directional input device provided by the present disclosure includes:

a cover defining an opening;

an operator comprising an operating part protruding upward from the opening, the operator being pivotable by the operating part;

a first rocker arm and a second rocker arm rotating with pivoting of the operator, rotating axes of the first rocker arm and the second rocker arm being perpendicular to each other;

a first rotary electrical component and a second rotary electrical component respectively detecting rotation of the first rocker arm and rotation of the second rocker arm; and a base fixing the cover; where:

the first rocker arm and the second rocker arm are distributed in up-down direction, the first rocker arm and the second rocker arm each includes a C-shaped part, a rotating shaft part is provided on opposite ends of the C-shaped part, the rotating shaft part is fixed by the cover, a rotating axis is defined at both ends of the rotating shaft part, and the rotating shaft part is fixed by the cover; the operating part is penetrated through the C-shaped part, and the C-shaped part defines an elongated hole guiding the operating part to pivot.

In an embodiment of the present disclosure, the cover defines a circular hole, and the first rocker arm and the second rocker arm each is rotatably matched with the cover through the rotating shaft part and the circular hole only.

In an embodiment of the present disclosure, the rotating axes of the first rocker arm and the second rocker arm are located in a same horizontal plane.

In an embodiment of the present disclosure, the operator includes a plane part opposite to an inner side surface of the elongated hole of the first rocker arm or the second rocker arm.

The present disclosure further provides a game machine, including a multi-directional input device, where the multi-directional input device includes:

a cover defining an opening;

an operator comprising an operating part protruding upward from the opening, the operator being pivotable by the operating part;

a first rocker arm and a second rocker arm rotating with pivoting of the operator, rotating axes of the first rocker arm and the second rocker arm being perpendicular to each other;

a first rotary electrical component and a second rotary electrical component respectively detecting rotation of the first rocker arm and rotation of the second rocker arm; and a base fixing the cover; where:

the first rocker arm and the second rocker arm are distributed in up-down direction, the first rocker arm and the second rocker arm each includes a C-shaped part, a rotating shaft part is provided on opposite ends of the C-shaped part, the rotating shaft part is fixed by the cover, a rotating axis is defined at both ends of the rotating shaft part, and the rotating shaft part is fixed by the cover; the operating part is penetrated through the C-shaped part, and the C-shaped part defines an elongated hole guiding the operating part to pivot.

According to the technical solution of the present disclosure, the first rocker arm and the second rocker arm of the multi-directional input device each includes a C-shaped part, the C-shaped part defines an elongated hole through which the operating part of the operator penetrates, and the operating part is abutted against hole walls of the elongated holes of the first rocker arm and the second rocker arm. At this time, when the operating part of the operator is pivoted, the operating part may drive the first rocker arm by applying force to the hole wall of the elongated hole of the first rocker arm, or drive the second rocker arm by applying force to the hole wall of the elongated hole of the second rocker arm. Compared with the related art in which the first rocker arm and the second rocker arm of the multi-directional input device are driven by different parts of the operator, in this solution, the operator drives the first rocker arm and the second rocker arm through the operating part, that is, the first rocker arm and the second rocker arm of the multi-directional input device in this solution are driven by a same part of the operator. Thus, the possibility that the first rocker arm and the second rocker arm generate different resistances to the operator is reduced, thereby ensuring the consistency of the hand feeling of the multi-directional input device during use. In addition, since the first rocker arm and the second rocker arm in this solution are generally C-shaped, the distribution of the first rocker arm and the second rocker arm may be more compact, reducing the occupation of space, therefore, the overall volume of the multi-directional input device can be reduced to make it easy to manage and carry.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are merely some embodiments of the present disclosure. For those of ordinary skill in the art, other drawings can be obtained based on the structure shown in these drawings without paying creative work.

Figure 1:
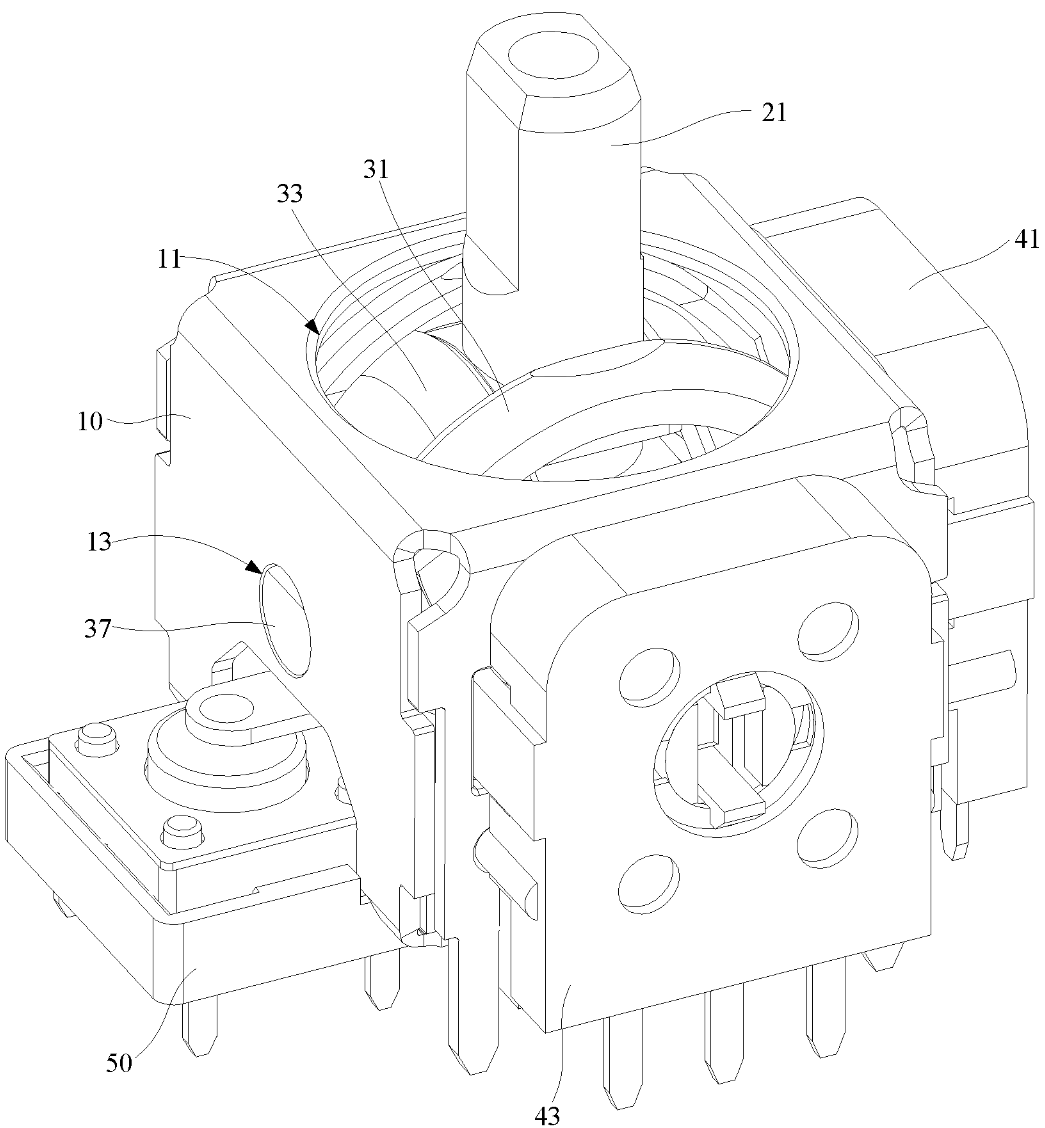
FIG. 1 is a schematic assembly view of a multi-directional input device according to an embodiment of the present disclosure.

The realization of the objects, functional characteristics and advantages of the present disclosure will be further described in conjunction with the embodiments and with reference to the drawings.

DETAILED DESCRIPTION OF THE EMBODIMENTS

In the following, the technical solutions in the embodiments of the present disclosure will be clearly and completely described with reference to the drawings in the embodiments of the present disclosure. Obviously, the described embodiments are only a part of the embodiments of the present disclosure, but not all of the embodiments. Based on the embodiments of the present disclosure, all other embodiments obtained by those of ordinary skill in the art without creative efforts shall fall within the claimed scope of the present disclosure.

It should be noted that all directional indicators (such as up, down, left, right, front, back, etc.) in the embodiments of the present disclosure are only used to explain the relative positional relationship, movement situation, etc. between components in a specific posture (as shown in the drawings). If the specific posture changes, the directional indication also changes accordingly.

In the present disclosure, unless otherwise clearly specified and limited, the terms “connected”, “fixed”, etc. should be understood in a broad sense. For example, “fixed” can be a fixed connection, a detachable connection, or a whole; it can be a mechanical connection or an electrical connection; it can be a direct connection or an indirect connection through an intermediary, and it can be the internal communication between two components or the interaction relationship between two components, unless specifically defined otherwise. For those of ordinary skill in the art, the specific meanings of the above terms in the present disclosure can be understood according to specific circumstances.

In addition, the descriptions related to “first”, “second”, and the like in the present disclosure are for descriptive purposes only, and cannot be understood as indicating or implying their relative importance or implicitly indicating the number of technical features indicated. Therefore, the features defined with “first” and “second” may explicitly or implicitly include at least one of the features. In addition, the technical solutions between the various embodiments can be combined with each other, but they must be based on what can be achieved by those of ordinary skill in the art. When the combination of technical solutions is contradictory or cannot be achieved, it should be considered that such a combination of technical solutions does not exist, nor within the protection scope of the present disclosure.

The present disclosure provides a multi-directional input device.

Figure 2:
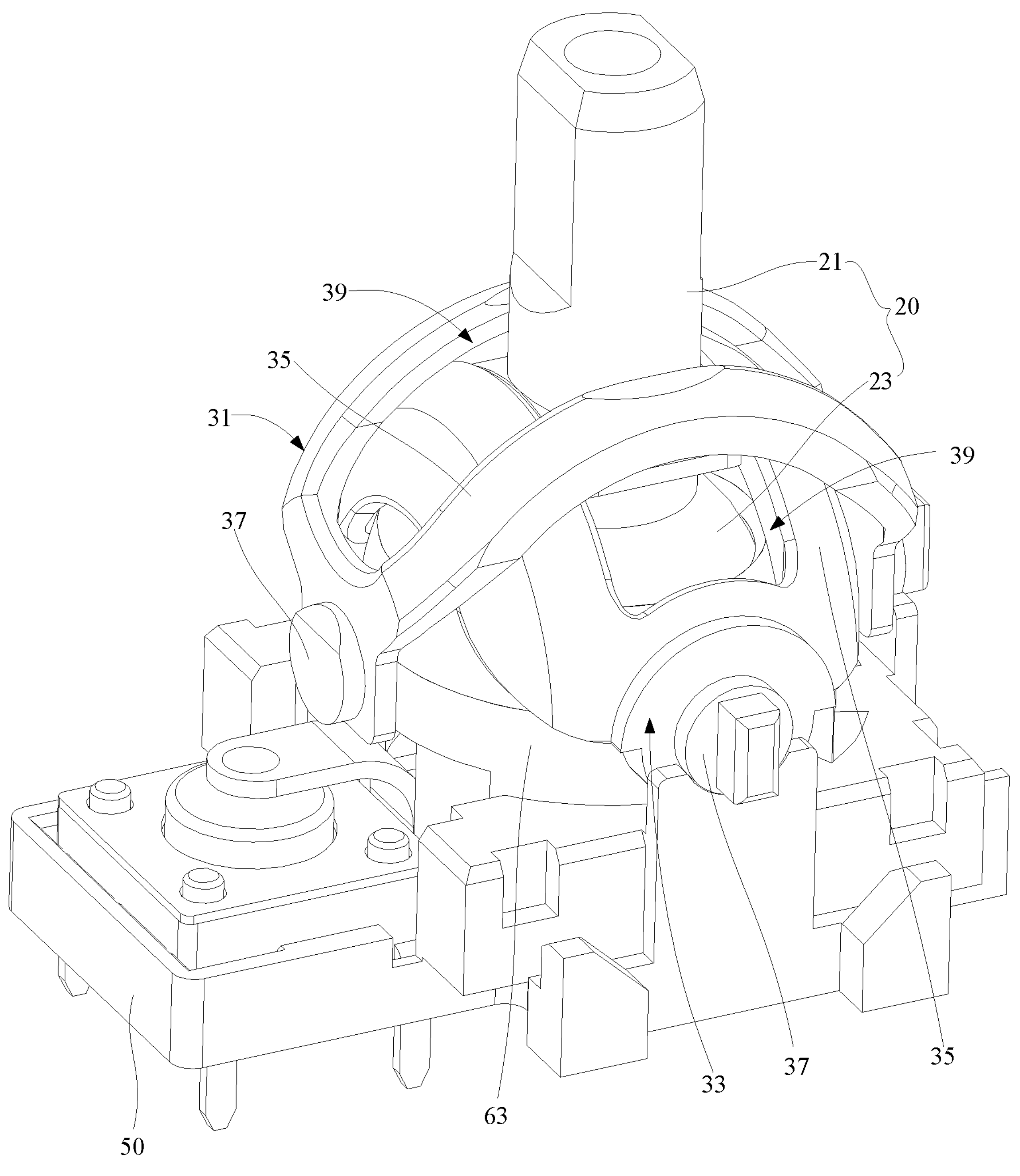
FIG. 2 is a partial view of the multi-directional input device in FIG. 1 with a cover removed.
Figure 3:
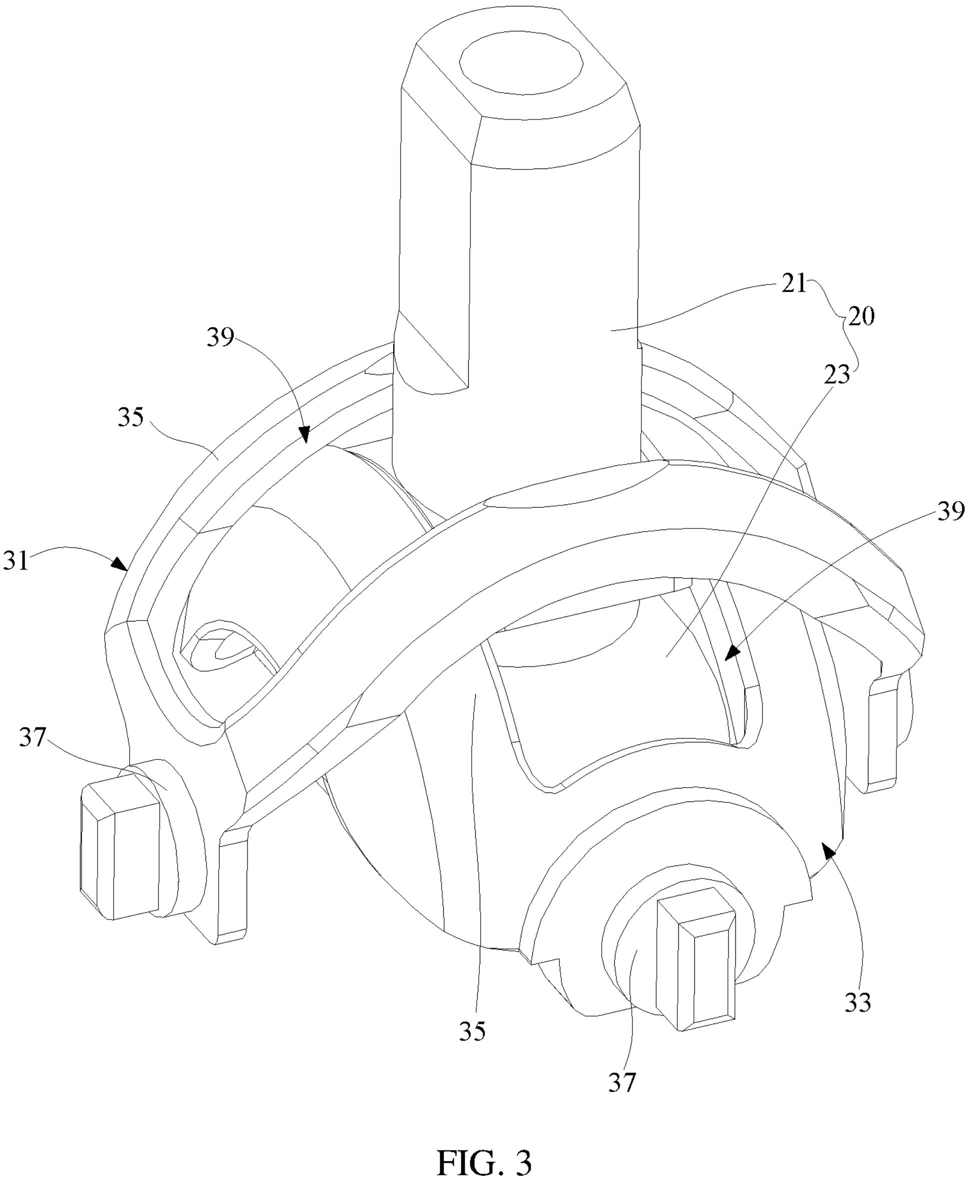
FIG. 3 is a schematic assembly view of an operator, a first rocker arm and a second rocker arm of the multi-directional input device in FIG. 1.

Referring to FIGS. 1, 2 and 3, in an embodiment of the present disclosure, the multi-directional input device includes a cover 10, an operator 20, a first rocker arm 31, a second rocker arm 33, a first rotary electrical component 41, a second rotary electrical component 43, and a base 50. The cover 10 defines an opening 11. The operator 20 includes an operating part 21 protruding upward from the opening 11, and the operator 20 is pivotable by the operating part 21. The first rocker arm 31 and the second rocker arm 33 rotate with pivoting of the operator 20, and rotating axes of the first rocker arm 31 and the second rocker arm 33 are perpendicular to each other. The first rotary electrical component 41 and the second rotary electrical component 43 respectively detect rotation of the first rocker arm 31 and the second rocker arm 33. The cover 10 is fixed by the base 50. The first rocker arm 31 and the second rocker arm 33 are distributed in up-down direction. The first rocker arm 31 and the second rocker arm 33 each includes a C-shaped part 35, a rotating shaft part 37 is provided on opposite ends of each of the C-shaped parts 35 of the first rocker arm 31 and the second rocker arm 33. Each rotating shaft part 37 is fixed by the cover 10, and a rotating axis is defined at both ends of the rotating shaft part 37. An arched part of the C-shaped part 35 is located at a top, and a part with the rotating shaft part 37 is located at a bottom. The first rocker arm 31 and the second rocker arm 33 rotate relative to the cover 10 through their respective rotating shaft part 37. The operating part 21 is penetrated through the C-shaped part 35, and the C-shaped part 35 defines an elongated hole 39 guiding the operating part 21 to pivot.

In an embodiment of the present disclosure, the cover 10 can be mainly configured to shield the first rocker arm 31, the second rocker arm 33 and part of the operator 20 (that is, the first rocker arm 31 and the second rocker arm 33 can be provided inside the cover 10), so as to reduce the possibility of damage by foreign objects, which is beneficial to extend the service life of the multi-directional input device. A projection of the cover 10 on a horizontal plane may be roughly square shape. Specifically, the cover 10 may include a bottom wall and a side wall. The bottom wall and the base 50 are oppositely arranged, and the bottom wall defines the opening 11. The side wall is arranged around a periphery of the bottom wall and is extended in a direction facing the base 50, and an end of the side wall away from the bottom wall is connected to the base 50. In order to facilitate the repair and replacement of the parts located inside the cover 10, the side wall of the cover 10 may be detachably connected to the base 50, specifically may be connected by screws, buckle connection or magnetic fixation, etc., so as to simplify the disassembly and assembly process of the cover 10.

Certainly, the present disclosure is not limited thereto. In other embodiments, the cover 10 may be fixedly connected to the base 50.

Figure 5:
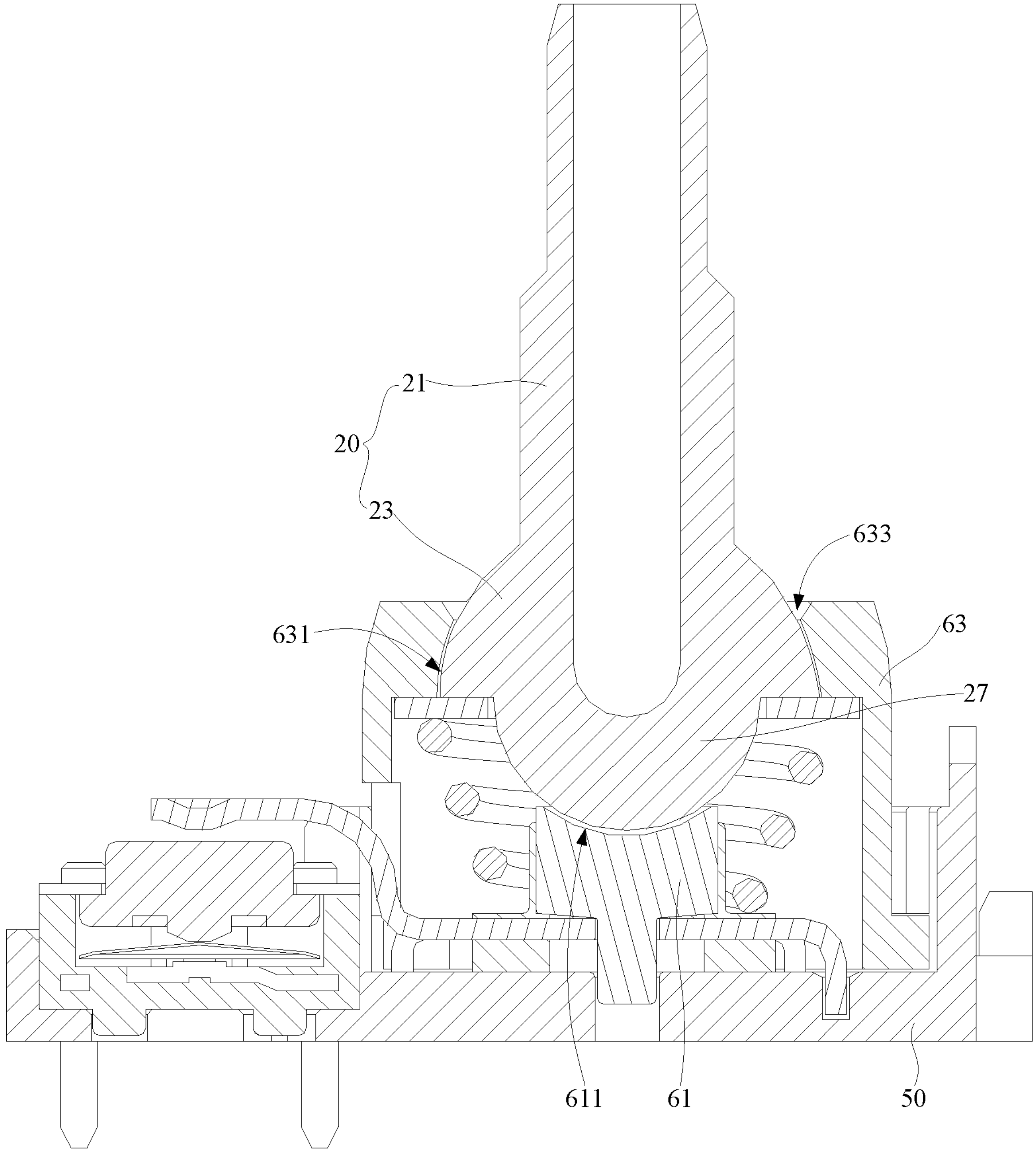
FIG. 5 is a cross-sectional view of a local structure of the multi-directional input device in FIG. 1.
Figure 6:
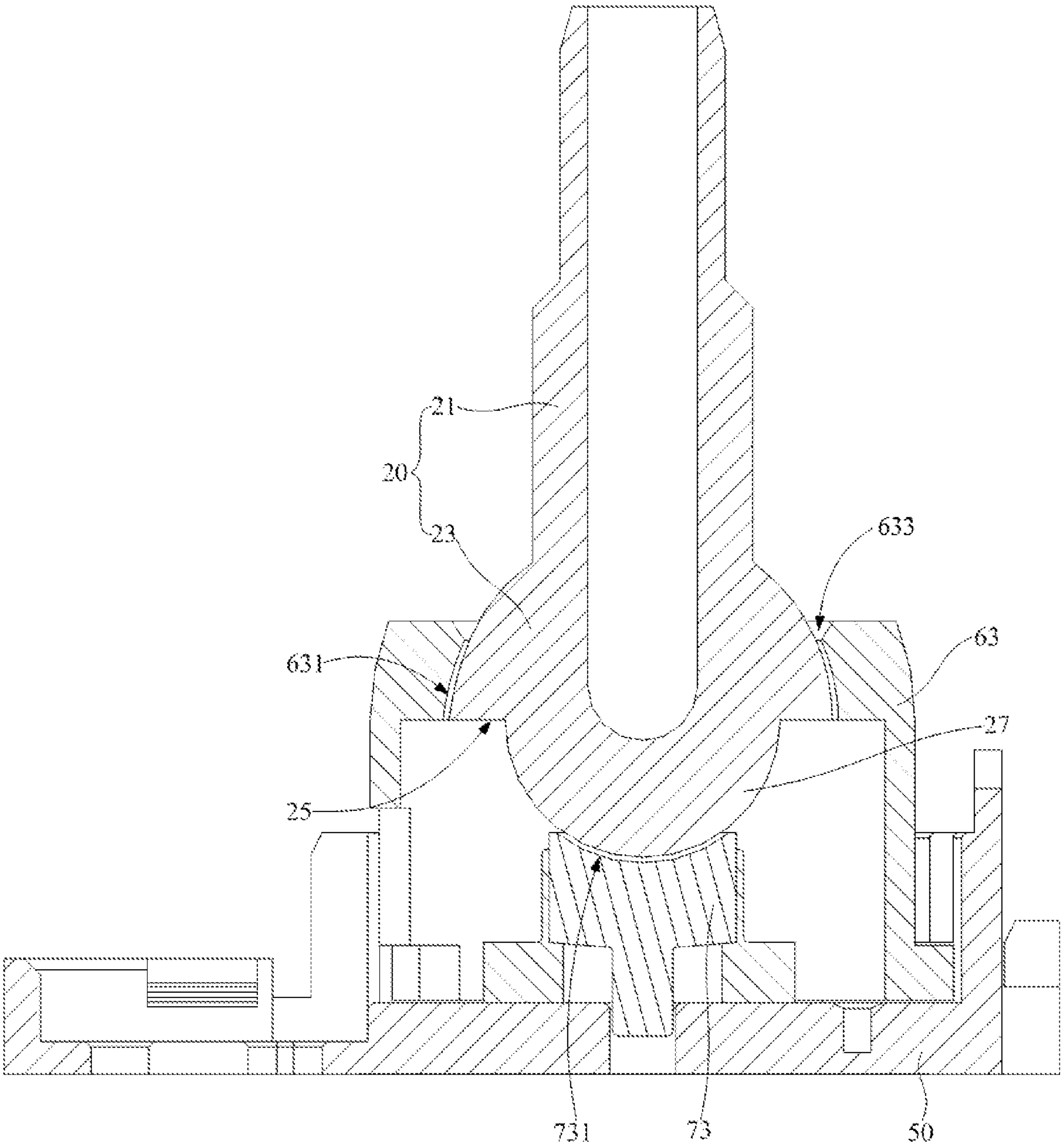
FIG. 6 is a cross-sectional view of another local structure of the multi-directional input device in FIG. 1.

The operator 20 may be mainly configured for the user to drive and perform the corresponding pivot action to realize the input of the corresponding action signal. For example, by driving the operator 20 to pivot forward, backward, left, or right, the corresponding forward, backward, left, or right action signals are input. The operating part 21 of the operator 20 is exposed to an outside of the cover 10 by penetrating through the opening 11 of the cover 10, and a projection of the operating part 21 on the horizontal plane may be circular. Please refer to FIGS. 2, 5 and 6, the operator 20 may further include an upper hemisphere 23 connected to a lower end of the operating part 21. The upper hemisphere 23 is hemispherical and has a diameter greater than a diameter of the operating part 21. A surface of the upper hemisphere 23 facing away from the operating part 21 is formed as a hemispherical plane part 25, and a lower hemisphere 27 is protruded from the hemispherical plane part 25. Spherical centers of the lower hemisphere 27 and the upper hemisphere 23 coincide, and a diameter of the lower hemisphere 27 is smaller than the diameter of the upper hemisphere 23.

At this time, the multi-directional input device may further include a lower support 61 and a substantially cylindrical upper support 63. The lower support 61 is arranged on the base 50 and located inside the cover 10. The lower support 61 includes a hemispherical concave 611 at an upper end, and the hemispherical concave 611 abuts against and supports the lower hemisphere 27. The upper support 63 is located inside the cover 10, and covers outside of the lower support 61. The upper support 63 defines a hemispherical hole 631 at a position corresponding to the opening 11. The upper support 63 further defines a through hole 633 communicated to the upper hemispherical hole 631 above the hemispherical hole 631, and a diameter of the through hole 633 is greater than the diameter of the operating part 21. A part of the upper hemisphere is abutted against a hole wall of the hemispherical hole 631, and another part of the upper hemisphere is protruded from the through hole 633.

In this way, the hole wall of the hemispherical hole 631 of the upper support 63 abuts against the upper hemisphere 23, and the upper end of the lower support 61 abuts against the lower hemisphere 27, so as to realize a spherical rotational fit of the operator 20, that is, the operator 20 may be rotated arbitrarily in directions of 360°.

Certainly, it should be noted that the present disclosure is not limited thereto. In other embodiments, the operator 20 may also be provided with a rotating section at a lower part of the operating part 21. One end of the rotating section is rotatably connected to the operating part 21, the other end of the rotating section is rotatably connected to the base 50, and a rotating axis of the rotating section and the operating part 21 is perpendicular to a rotating axis of the rotating section and the base 50, that is, one of which is parallel to the rotating axis of the first rocker arm 31, and the other one of which is parallel to the rotating axis of the second rocker arm 33.

The operating part 21 of the operator 20 sequentially penetrates through the first rocker arm 31 and the second rocker arm 33, and may be mainly configured for driving the first rocker arm 31 and the second rocker arm 33 to rotate accordingly. The rotating amounts of the first rocker arm 31 and the second rocker arm 33 are respectively detected by the first rotary electric component 41 and the second rotary electric component 43, so that corresponding signals may be output according to the rotating amounts. Defining an X direction and a Y direction perpendicular to each other on the horizontal plane, the rotating axis of the first rocker arm 31 may be along one of the X direction and the Y direction, and the rotating axis of the second rocker arm 33 may be along the other one of the X direction and the Y direction. The first rocker arm 31 and the second rocker arm 33 are located above the upper support 63.

In longitudinal sections of the first rocker arm 31 and the second rocker arm 33, middle sections of the first rocker arm 31 and the second rocker arm 33 are substantially in a C shape. Therefore, the middle sections of the first rocker arm 31 and the second rocker arm 33 are defined as the C-shaped parts 35, and the rotating shaft parts 37 are formed to be protruded from both ends of the middle section. The elongated holes 39 of the C-shaped parts 35 of the first rocker arm 31 and the second rocker arm 33 are configured for the operating part 21 to move therein. Since the rotating axes of the first rocker arm 31 and the second rocker arm 33 are perpendicular to each other, an extending direction of the elongated hole 39 of the C-shaped part 35 of the first rocker arm 31 and an extending direction of the elongated hole 39 of the C-shaped part 35 of the second rocker arm 33 are perpendicular to each other.

That is, when the operating part 21 drives the first rocker arm 31 to rotate, the operating part 21 moves along the elongated hole 39 of the C-shaped part 35 of the second rocker arm 33; and when the operating part 21 drives the second rocker arm 33 to rotate, the operating part 21 moves along the elongated hole 39 of the C-shaped part 35 of the first rocker arm 31. In order to improve the smoothness of the first rocker arm 31 and the second rocker arm 33 during their respective rotation, the C-shaped part 35 of the first rocker arm 31 and the C-shaped part 35 of the second rocker arm 33 are provided at intervals in the up-down direction.

The first rotary electrical component 41 and the second rotary electrical component 43 may be mainly configured for detecting the rotating amounts of the first rocker arm 31 and the second rocker arm 33, since the working principle of which is prior art, it will not be detailed here. The first rotary electrical component 41 may be arranged on the outside of the cover 10 and connected to the first rocker arm 31; and the second rotary electrical component 43 may also be arranged on the outside of the cover 10 and connected to the second rocker arm 33. The base 50 may be mainly configured to fix parts such as the cover 10, the lower support 61 and the upper support 63, and play a bearing and supporting role.

According to the technical solution of the present disclosure, the first rocker arm 31 and the second rocker arm 33 of the multi-directional input device each includes a C-shaped part 35. The C-shaped part 35 defines an elongated hole 39 through which the operating part 21 of the operator 20 penetrates, and the operating part 21 abuts against the hole walls of the elongated holes 39 on the first rocker arm 31 and the second rocker arm 33. At this time, when the operating part 21 of the operator 20 is pivoted, the operating part 21 may drive the first rocker arm 31 by applying force to the hole wall of the elongated hole 39 of the first rocker arm 31, or drive the second rocker arm 33 by applying force to the hole wall of the elongated hole 39 of the second rocker arm 33. Compared with the related art in which the first rocker arm 31 and the second rocker arm 33 of the multi-directional input device are driven by different parts of the operator 20, in this solution, the operator 20 drives the first rocker arm 31 and the second rocker arm 33 through the operating part 21, that is, the first rocker arm 31 and the second rocker arm 33 of the multi-directional input device in this solution are driven by a same part of the operator 20. Thus, the possibility that the first rocker arm 31 and the second rocker arm 33 generate different resistances to the operator 20 is reduced, thereby ensuring the consistency of the hand feeling of the multi-directional input device during use. In addition, since the first rocker arm 31 and the second rocker arm 33 in this solution are generally C-shaped, the distribution of the first rocker arm 31 and the second rocker arm 33 may be more compact, reducing the occupation of space, therefore, the overall volume of the multi-directional input device can be reduced to make it easy to manage and carry.

Please refer to FIG. 1 and FIG. 2, in an embodiment of the present disclosure, the cover 10 defines a circular hole 13, and the first rocker arm 31 and the second rocker arm 33 are rotatably matched with the cover 10 through their respective rotating shaft part 37 and the circular hole 13 only.

It can be understood that the circular holes 13 are defined on the cover 10 to achieve rotational fit with the rotating shaft parts 37 of the first rocker arm 31 and the second rocker arm 33, so that the rotating connection structure of the cover 10 with the first rocker arm 31 and the second rocker arm 33 is simplified, thereby facilitating the manufacture of the cover 10 while reducing the manufacturing cost of the cover 10. Certainly, it should be noted that the present disclosure is not limited thereto. In other embodiments, a cylinder may be provided at a position of the cover 10 corresponding to the rotating shaft part 37, and the cylinder is inserted into the rotating shaft part 37.

In an embodiment of the present disclosure, the rotating axes of the first rocker arm 31 and the second rocker arm 33 are located in a same horizontal plane.

It can be understood that the rotating axes of the first rocker arm 31 and the second rocker arm 33 are located in the same horizontal plane, so that rotation center points of the first rocker arm 31 and the second rocker arm 33 coincide, this may further ensure the consistency of rotation of the first rocker arm 31 and the second rocker arm 33 when being driven, and further improve the consistency of the hand feeling of the first rocker arm 31 and the second rocker arm 33 when driven. Certainly, the present disclosure is not limited thereto. In other embodiments, it is also possible that the rotation axes of the first rocker arm 31 and the second rocker arm 33 have a slight height difference in the up-down direction, as long as it can be ensured that the first rocker arm 31 and the second rocker arm 33 have the same hand feeling when driven by the operator 20.

Figure 4:
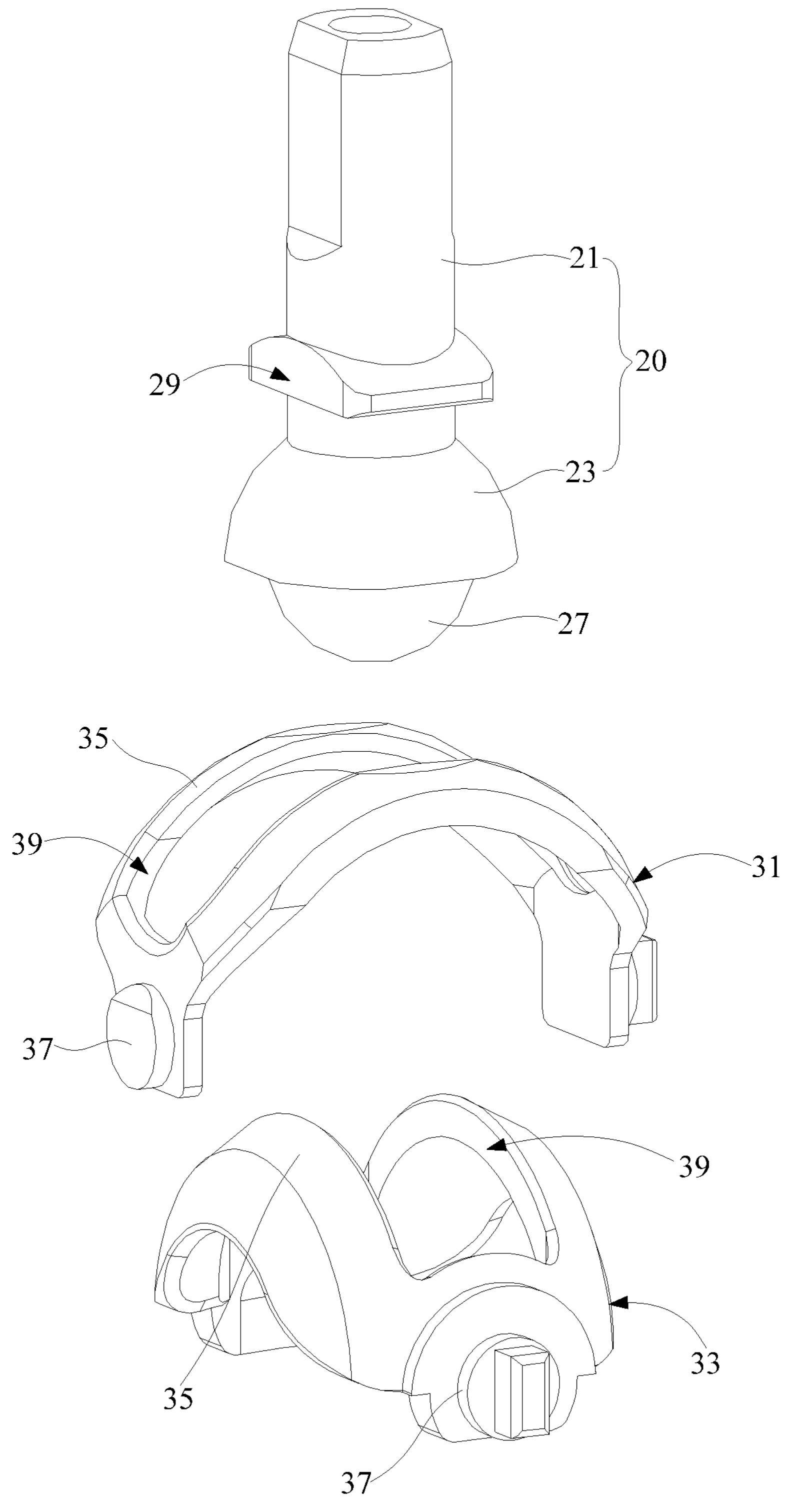
FIG. 4 is a schematic exploded view of the operator, the first rocker arm and the second rocker arm of the multi-directional input device in FIG. 3.

Please refer to FIG. 3 and FIG. 4, in an embodiment of the present disclosure, the operator 20 includes a plane part 29 opposite to an inner side surface of the elongated hole of the first rocker arm 31 or the second rocker arm 33.

It can be understood that the operator 20 abuts against the inner side surface of the elongated hole on the first rocker arm 31 or the second rocker arm 33 through two opposite plane parts 29, which may play a limiting role on the operator 20, and avoid the rotation of the operator 20, which may affect the detection results of the first rocker arm 31 and the second rocker arm 33. It may be that the operator 20 forms two opposite plane parts 29 opposite to the inner side surface of the elongated hole of the first rocker arm 31, or it may be that the operator 20 forms two opposite plane parts 29 opposite to the inner side surface of the elongated hole of the second rocker arm 33.

The present disclosure further provides a game machine, which includes a multi-directional input device, and the specific structure of the multi-directional input device refers to the above embodiments. Since the game machine adopts all the technical solutions of all the above-mentioned embodiments, it has at least all the beneficial effects brought by the technical solutions of the above-mentioned embodiments, which will not be repeated here. The game machine may further include a display device, and the multi-directional input device and the display device are electrically connected.

The above is only preferable embodiments of the present disclosure, and thus does not limit the scope of the present disclosure, and the equivalent structural transformation made by the content of the specification and the drawings of the present disclosure, or directly/indirectly applied to other related technical fields are all included in the patent protection scope of the present disclosure.

What is claimed is:

1. A multi-directional input device, comprising:

a cover defining an opening;

an operator comprising an operating part protruding upward from the opening, the operator being pivotable by the operating part;

a first rocker arm and a second rocker arm rotating with pivoting of the operator, rotating axes of the first rocker arm and the second rocker arm being perpendicular to each other;

a first rotary electrical component and a second rotary electrical component respectively detecting rotation of the first rocker arm and rotation of the second rocker arm; and a base fixing the cover; wherein:

the first rocker arm and the second rocker arm are distributed in an up-down direction, the first rocker arm and the second rocker arm each comprises a C-shaped part and two rotating shaft parts provided on opposite ends of the C-shaped part, a rotating axis is defined by the two rotating shaft parts, and the two rotating shaft parts are fixed by the cover; the C-shaped part defines an elongated hole guiding the operating part to pivot, and the operating part is penetrated through the elongated hole of the C-shaped part.

2. The multi-directional input device of claim 1, wherein the cover defines a circular hole, and the first rocker arm and the second rocker arm each is rotatably matched with the cover through the rotating shaft part and the circular hole only.

3. The multi-directional input device of claim 1, wherein the rotating axes of the first rocker arm and the second rocker arm are located in a same horizontal plane.

4. The multi-directional input device of claim 1, wherein the operator comprises a plane part facing hole walls of the elongated hole of the first rocker arm or facing hole walls of the elongated hole of the second rocker arm.

5. A game machine comprising the multi-directional input device as recited in claim 1.

6. The game machine of claim 5, wherein the cover defines a circular hole, and the first rocker arm and the second rocker arm each is rotatably matched with the cover through the rotating shaft part and the circular hole only.

7. The game machine of claim 5, wherein the rotating axes of the first rocker arm and the second rocker arm are located in a same horizontal plane.

8. The game machine of claim 5, wherein the operator comprises a plane part facing hole walls of the elongated hole of the first rocker arm or facing hole walls of the elongated hole of the second rocker arm.

* * * * *